Feb. 3, 1931.  J. T. SIBLEY  1,791,149
ELECTRIC MOTOR
Filed March 14, 1928  2 Sheets-Sheet 1

James T. Sibley INVENTOR
BY Warren E. Willis, ATTORNEY

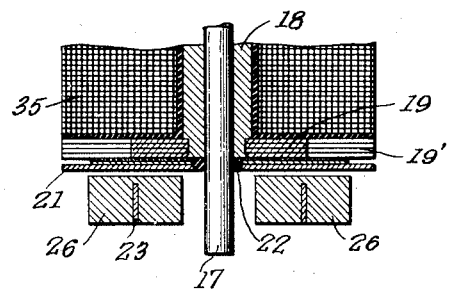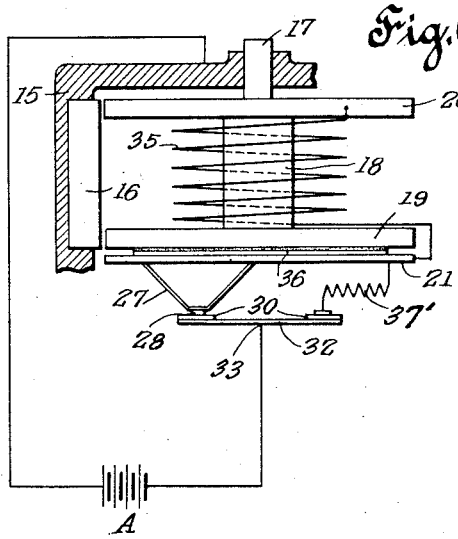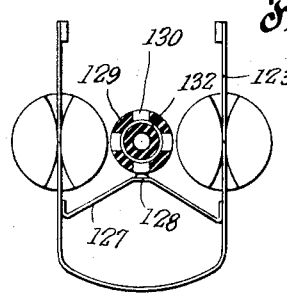

Patented Feb. 3, 1931

1,791,149

UNITED STATES PATENT OFFICE

JAMES T. SIBLEY, OF NEW DORP, NEW YORK, ASSIGNOR TO STEVENS MANUFACTURING CORPORATION, OF NEW YORK, N. Y., A CORPORATION OF DELAWARE

ELECTRIC MOTOR

Application filed March 14, 1928. Serial No. 261,461.

This invention relates to electric motors and more particularly to fractional horsepower electric motors of the type designed to operate phonographs and other like mechanisms at constant speed.

The usual phonograph of the portable type is operated by a spring motor which must be rewound after the playing of a few records, and obviously it would be a great convenience to operate such an instrument by a small electric motor receiving its current from dry cells. However, many attempts have been made to produce an electric motor which can be used economically with dry cells, and at the same time operate at a constant speed regardless of current fluctuations and a drop in potential.

It is therefore an object of this invention to provide an electric motor which may be economically and efficiently operated on dry cells without change in polarity, and which is simple in structure.

A further feature is to provide means for correctly governing an electric motor so that a constant speed may be maintained, regardless of current fluctuations due to sudden excessive loads or drops in potential.

Another object is the provision of means to eliminate sparking at the current breaker during the governing operation, and to lubricate the current breaker surface, at the same time further reducing sparking.

Other objects are to provide means for varying the speed of an electric motor at will; and to provide for an electric motor a speed governing device in which the motion of suspended governing weights is conveyed to a contact brush and varies the position of the latter relative to a current breaker.

These and other important objects are attained by the novel construction, combination and arrangement of parts, hereinafter described and shown in the accompanying drawing, constituting a material part of this disclosure, and in which:—

Figure 5 is a partial sectional view of the motor rotor showing its structure and connections.

Figure 6 is a diagrammatical view showing the electrical connections.

Figure 7 is a view showing a modification of the governing device.

Figure 1:
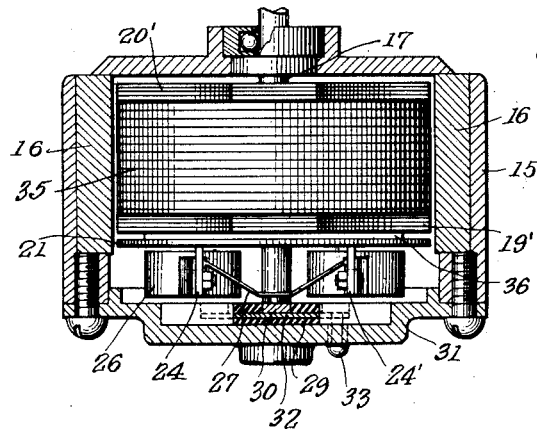
Figure 1 is a longitudinal sectional view of the motor.

Referring to the drawings in greater detail, Figure 1 shows an electric motor having a non-magnetic casing 15, having attached to its inner surface a plurality of equally spaced stationary armature bars 16, the south poles of which are located in the lower part of the casing, and the north poles in the upper part of the casing.

Journalled in the casing is a shaft 17, to which is fixed a core 18, the latter having laminated north and south poles, 19—20, respectively, each pole having a plurality of projections 19'—20', the width of each projection being approximately equal to the width of the armature bars 16. Spaced from the pole 19 and mounted on the shaft 17, is a metal disc 21 insulated from the shaft by a dielectric bushing 22.

Figure 2:
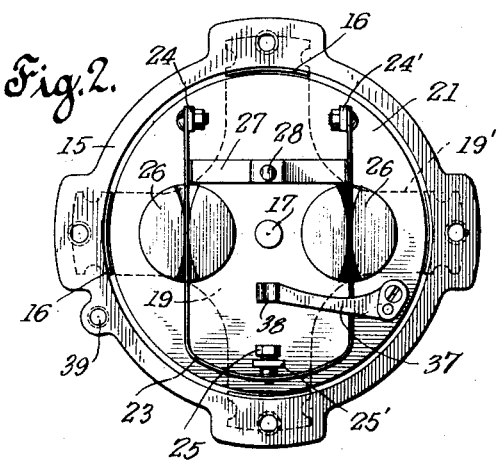
Figure 2 is an end view showing the speed governing device.

Mounted on the disc 21 is a U-shaped leaf spring 23 (see Figure 2) having its extremities fixed to the disc 21 at points 24—24' and its curved portion engaged by an adjusting screw 25 in a stud 25' set in the disc 21. Midway the length of each leg of the spring 23 are secured governing weights 26 which cause the legs to bend outwardly upon acceleration of the speed of rotation of the disc 21 over the normal.

Figure 3:
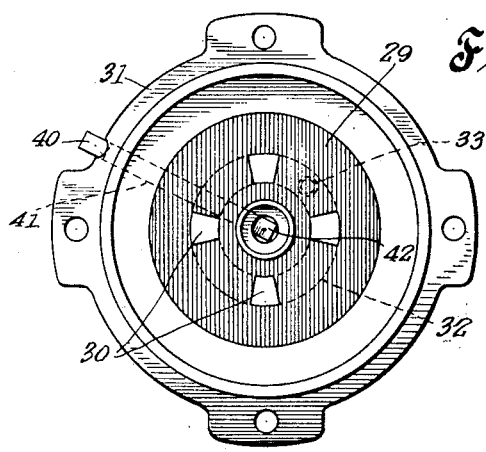
Figure 3 is a plan view of the current breaker and the interior of the motor casing cap.

Fixed to the legs of the spring 23 is a V-shaped spring 27 having at its apex a contact brush 28 adapted to brush over a current breaker 29, which comprises a disc of insulating material having embedded therein copper contacts 30, spaced apart, according to the number of poles. (See Figure 3.)

The current breaker 29 is non-rotatably mounted on the casing cover 31, and is provided with a central aperture through which the shaft 17 passes.

The contacts 30 are integral with a copper ring 32 having a fixed terminal 33 connected to the negative terminal of a battery of dry cells, generally indicated at A, the positive terminal of which is grounded to the casing 15.

Wound about the core 18 is a coil 35 having one end grounded to the core 18 and the other end connected to the disc 21.

It will be seen that the flow of current is from the positive terminal of the battery, through the casing bearings, and core 18 to the coil 35, thence to the disc 21 and through the springs 23 and 27 to contact the brush 28, which intermittently engages the contacts 30 to complete the circuit to the negative terminal of the battery.

In operation, when current flows through coil 35, the north pole projections on the core 18 are attracted by the south poles of the armature bars 16.

The parts of the motor are so arranged that the contact brush 28 is in engagement with one of the contacts 30 when the projections 20' are midway between adjacent field armature bars and when the projections are directly beneath the poles, the contact brush 28 engages the insulating disc 29 and the circuit is open.

When a critical speed is reached centrifugal force causes the weights 26 to move outwardly, flexing the legs of the spring 23 and causing the spring 27 to spread, withdrawing the brush 28 from engagement with the disc 29. The circuit will thus remain open until the speed has decreased to the desired normal rate to allow the weights 26 to be moved inwardly to raise the brush 28.

In order to decrease sparking when the circuit is broken, an electronic dry contact rectifier 36, such as copper oxide in contact with metallic copper, is placed between the disc 21 and the adjacent laminated pole piece 19. This rectifier has the peculiar characteristic of allowing current to pass freely in one direction, while preventing the flow of current in the opposite direction. With this arrangement, when the circuit is broken, the flow of the induced current in the coil will be from the coil to the disc 21, through the kuprox disc 36 to the core 18 and back through the coil. (See diagram, Figure 6.)

As a further means of decreasing sparking, a leaf spring 37, of high electrical resistance, is fixed to the disc 21 and is provided with a carbon contact 38 at its free extremity. The carbon element 38 engages the contacts 30 and also serves as a lubricator for the contacting surfaces, being constantly held against the disc member 29 by the spring 37. The high resistance of the spring 37 also maintains a closed circuit regardless of the speed of the motor. In the diagram shown in Figure 6, a resistance coil 37' is indicated as connecting the disc 21 and contacts 30, all other elements being substantially as previously described.

Figure 4:
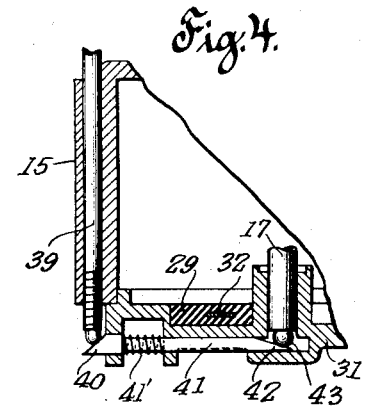
Figure 4 is a fragmentary sectional view showing means for varying the speed of the motor.

A rod 39 has its lower portion in threaded engagement with the casing 15, (Figure 4), its lower extremity being spherical and engages the bevelled end 40 of a bar 41, which has its other end 42 bevelled to engage a metal ball 43 resting in a spherical recess in the end of shaft 17. A spring 41' encircles a portion of the bar 41, abutting a shoulder on the bar and casing respectively, tending to force the bar outwardly into engaging position with the rod end.

When a slow speed is desired the rod 39 is forced down against bevel 41 and this force is transmitted to ball 43 to force the shaft 17 upwardly in its bearings. Obviously, other expedients might be substituted for accomplishing the same result. Since the disc 21 is mounted on the shaft to move therewith, the U-spring 23 is moved away from the breaker disc 29, and consequently, less speed is required to open the circuit.

In Figure 7 is shown a modified form of current interrupter in which a V-spring 127 is mounted so as to be in the same plane as the U-spring 123, to which it is connected. A contact brush 128 engages the contacts 130 which are mounted on the periphery of the insulating cylinder, the contacts 130 being integral with a current conducting ring.

From the above description, it will be seen that the foregoing discloses a balanced motor having a short magnetic field which is especially adaptable for the operation of phonographs at constant speed. It will also be seen that the flow of the pulsating current is uni-directional and consequently there is no change in polarity.

Although the improvements have been described with considerable detail and with respect to certain particular forms of my invention, it is not limited to such details since many changes and modifications may well be made without departing from the spirit and scope of the invention in its broadest aspect.

Having thus described the invention, what is claimed as new and desired to secure by Letters Patent, is:—

1. An electric motor comprising a non-magnetic casing having a plurality of equally spaced stationary armature bars mounted on its interior, a shaft journalled in said casing, a core mounted on said shaft, said core having laminated pole pieces shaped to have a plurality of projections, a coil wound about said core, a disc mounted on the shaft and insulated from the shaft and core, said coil having one end connected to the disc and the other end to the core, a contact brush connected to said disc and engaging a current breaker mounted on the casing, and means operated by centrifugal force to move said brush to an inoperative position when the speed of the motor exceeds a predetermined rate.

2. In an impulse motor adapted to operate on current supplied by a battery of dry cells, a disc connected in the electrical circuit, a U shaped spring member mounted on said disc, a contact brush mounted on the bight of said spring and adapted to engage a current breaker, and governing weights mounted on the arms of said spring to flex the spring to move the brush to an inoperative position when the speed of the motor exceeds a predetermined rate.

3. In an electric motor, a shaft having a disc mounted thereon and insulated therefrom, a U-shaped spring mounted on the disc, a V-shaped spring mounted on the U-shaped spring and having a contact brush at its apex, and governing weights fixed to the legs of the U-shaped spring.

4. In an electric motor having a shaft upon which is mounted a speed governing device dependent upon the vertical position of the shaft, a rod having bevelled ends disposed transversely to the shaft, said shaft resting upon one of the ends of said rod for adjusting the vertical position of the shaft so that the governing device may be effective at different selected speeds and means for shifting said rod lengthwise.

5. In an impulse motor operating upon current supplied by dry cells, a disc connected in the electrical circuit, a U-shaped spring member mounted on the disc, a contact brush mounted on the bight of said spring and adapted to engage a circuit breaker, and governing means connected with the spring to move the brush to an inoperative position when the speed of the motor exceeds a predetermined rate.

6. In an electric motor, a shaft having a disc mounted thereon and insulated therefrom, a bowed spring mounted on the disc, a second bowed spring mounted on the first spring and having a contact brush at its apex, and governing means connected with the first spring.

In testimony whereof I affix my signature.

JAMES T. SIBLEY.